(12) United States Patent
Prokhorov

(10) Patent No.: US 7,593,796 B2
(45) Date of Patent: Sep. 22, 2009

(54) TORQUE ESTIMATOR FOR INTERNAL COMBUSTION ENGINE

(75) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 262 days.

(21) Appl. No.: 11/563,259

(22) Filed: Nov. 27, 2006

(65) Prior Publication Data

US 2008/0125929 A1    May 29, 2008

(51) Int. Cl.
*G01M 17/00* (2006.01)
*G06F 7/00* (2006.01)

(52) U.S. Cl. .............................. 701/29; 701/32; 701/34; 701/35

(58) Field of Classification Search ........................ None
See application file for complete search history.

(56) References Cited

U.S. PATENT DOCUMENTS

| | | | |
|---|---|---|---|
| 3,934,459 A | 1/1976 | Wolfinger et al. | |
| 5,531,108 A | 7/1996 | Feldkamp et al. | |
| 5,631,411 A | 5/1997 | Harms et al. | |
| 5,699,253 A | 12/1997 | Puskorius et al. | |
| 5,774,823 A | 6/1998 | James et al. | |
| 5,781,700 A * | 7/1998 | Puskorius et al. | 706/14 |
| 6,082,187 A * | 7/2000 | Schricker et al. | 73/114.13 |
| 6,434,541 B1 * | 8/2002 | Tawel et al. | 706/30 |
| 6,668,795 B1 * | 12/2003 | Shimada | 123/350 |
| 2005/0075826 A1 * | 4/2005 | Kitazawa | 702/141 |

FOREIGN PATENT DOCUMENTS

EP    0736760    10/1996

OTHER PUBLICATIONS

L. Feldkamp, D. Prokhorov, C. Eagen, and F. Yuan, "Enhanced Multi-Stream, Kalman Filter Training for Recurrent Networks", in J. Suykens and J. Vandewalle (Eds.) "Nonlinear Modeling: Advanced Black-Box Techniques", Kluwer Academic Publishers, 1998.
D. Prokhorov, G. Puskorius, and L. Feldkamp. "Dynamical Recurrent Networks in Control", in "A Field Guide to Dynamic Recurrent Networks", IEEE Press, 2001, pp. 23-78.
B. Lee, G. Rizzoni, Y. Guezennec, A. Soliman, M. Cavalletti, and J. Waters. "Engine Control Using Torque Estimation". SAE Technical Paper Series, Society of Automotive Engineers, 2001.

* cited by examiner

*Primary Examiner*—Khoi Tran
*Assistant Examiner*—Bhavesh V Amin
(74) *Attorney, Agent, or Firm*—Gifford, Krass, Sprinkle, Anderson & Citkowski, P.C.

(57) ABSTRACT

An apparatus for the determination of engine torque comprises a neural network receiving engine operational data, such as crankshaft rotation data, and providing an output corresponding to engine torque. The neural network may be, for example, a recurrent neural network (RNN) that is configured using training data obtained using a training process. By comparing a determined engine torque with an intended engine torque, for example determined from engine control input values such as throttle position, a useful engine diagnostic is obtained.

12 Claims, 4 Drawing Sheets

TORQUE ESTIMATOR FOR INTERNAL COMBUSTION ENGINE

FIELD OF THE INVENTION

The invention relates to improved methods and apparatus for engine torque determination, in particular to neural network based torque estimation for an internal combustion engine, and to improved vehicle powertrain safety systems.

BACKGROUND OF THE INVENTION

Determination of engine torque is useful for optimizing engine control. In addition, the safety of vehicle operation can be enhanced through improved diagnostics of engine performance.

SUMMARY OF THE INVENTION

In representative embodiments of the present invention, an apparatus for the determination of engine torque comprises a neural network receiving crankshaft rotation data, and providing an output corresponding to engine torque. The neural network may be trained, for example using a representative vehicle of a class, type, or model of vehicle. The neural network may receive crankshaft rotation data, for example, in the form of time intervals from a crankshaft rotation sensor. A pre-processing unit may receive data from a crankshaft rotation sensor and provide time interval data to the neural network, corresponding to time intervals over which the crankshaft rotates a certain angular increment. The neural network may be a recurrent neural network (RNN), which may be trained using a training procedure to give accurate torque estimations from the received data.

In some embodiments, a power train safety system is provided that comprises a torque sensor, providing an indication of engine torque; a control input monitor, providing an indication of intended torque; and a comparator, receiving the indication of engine torque and indication of intended torque, and providing a diagnostic output. The torque sensor may be a direct sensor located within the engine, or may be an indirect sensor providing a determination of torque from one or more engine output parameters. For example, torque may be determined from crankshaft rotation data. A control input monitor receives data from one or more control input sensors, such as a throttle position sensor, airflow sensor, or fuel flow sensor. The control input monitor provides an indication of the driver's intent regarding the engine torque. The comparator compares the actual engine torque with the intended torque, and provides a diagnostic output, for example, if the difference and/or ratio of actual torque to intended torque exceeds a threshold value. The diagnostic output may include an error code stored in a memory location associated with the engine, a warning light, modification of engine operation, correction of control input sensor outputs, and the like.

The control input monitor may receive data from one or more control input sensors, such as a throttle position sensor, air flow sensor, fuel flow sensor, and the like. The control input monitor may comprise a second neural network, receiving data from one or more sensors and providing a determination of intended torque. The intended torque may be the engine torque desired by the driver, or the torque expected for one or more control input values. The second neural network may also be a recurrent neural network.

During an example training process, a vehicle equipped with a direct torque sensor and a neural network based indirect torque sensor is operated over a range of conditions. The neural network is trained to provide a torque measurement corresponding to that obtained using the direct sensor. Having obtained training data, these may be used in similar vehicles. An advantage of this approach is that direct torque sensors may be expensive and unreliable. Most vehicles are equipped with a crankshaft rotation sensor, hence the data required for the neural network is already provided. An apparatus according to an embodiment of the present invention provides accurate engine torque data without the need for additional expensive, and possibly unreliable, direct torque sensors. The determination of engine torque may then be used in improved engine control systems, and powertrain safety systems.

In a further embodiment of the present invention, an apparatus for providing a diagnostic output relative to the operation of an internal combustion engine comprises a first neural network receiving engine output data, and a second neural network, receiving control input data from at least one control input sensor. The apparatus further comprises a comparator, receiving an engine torque determined by the first neural network, and an intended engine torque determined by the second neural network. The comparator compares the determined engine torque to the intended engine torque, as determined from engine control input data, and provides a diagnostic output. For example, the diagnostic output may be a warning if the intended torque and determined torque differ by more than a threshold value.

A method for determining an engine torque for a vehicle of interest comprises training a neural network using a training configuration, such as a training vehicle similar to the vehicle of interest. The engine of the training vehicle is equipped with a torque sensor providing training torque data, and a trainable neural network. The trainable neural network receives training operational data from the training engine, and is trained so that its output corresponds to the training torque data. Once trained, the trainable neural network then has a trained configuration. The trained configuration is then used to configure a neural network in the vehicle of interest, which receives operational data from the engine of the vehicle of interest, and provides an output that is a determination of engine torque. The operational data may be crankshaft rotation data, or other engine operational data.

DETAILED DESCRIPTION OF THE PREFERRED EMBODIMENTS

Determination of engine torque is useful for electronic engine control, for providing a diagnostic of engine operation (in particular, to detect unexpected operation), and for providing a powertrain safety monitor to assist avoidance of unintended vehicle acceleration. Determination of engine torque may be based on engine torque models derived from physical principles. Such models generally give acceptable results, but generally assume largely normal behavior of the engine and its associated sensors and actuators. Hence, direct torque sensors (or direct sensors of a related quantity such as in-cylinder pressure) are considered desirable. However, commercially available torque and in-cylinder pressure sensors are expensive and have reliability problems.

Engine torque can be determined from fluctuations in the rotational velocity of the crankshaft. Under ideal conditions, crankshaft velocity exhibits a periodic variation about its mean, with the amplitude of this variation being indicative of engine torque. Under realistic conditions, the expected periodic variation is obscured by factors such as non-steady operation, such as changes in engine speed, and torsional oscillations of the crankshaft.

Embodiments of the present invention include a novel method of torque estimation which exploits the existence of torsional oscillations. A neural network can be trained to estimate torque when provided with measured variations of the crankshaft speed as input. The patterns of torsional oscillations contain useful information about engine torque, which can be extracted using a neural network.

In other embodiments of the present invention, a powertrain safety monitor includes two neural networks that provide two independent determinations of engine torque. For example, the output of a first neural network may represent a determination of engine torque from engine operational parameters, such as crankshaft rotation data. The output of a second network may represent a determination of intended engine torque from engine control inputs such as throttle position. Deviations between outputs of the two networks provide a diagnostic output that may be used to detecting faults with the engine torque production. The powertrain safety monitor is applicable to most engine families and over substantially the entire range of engine operation.

Figure 1:
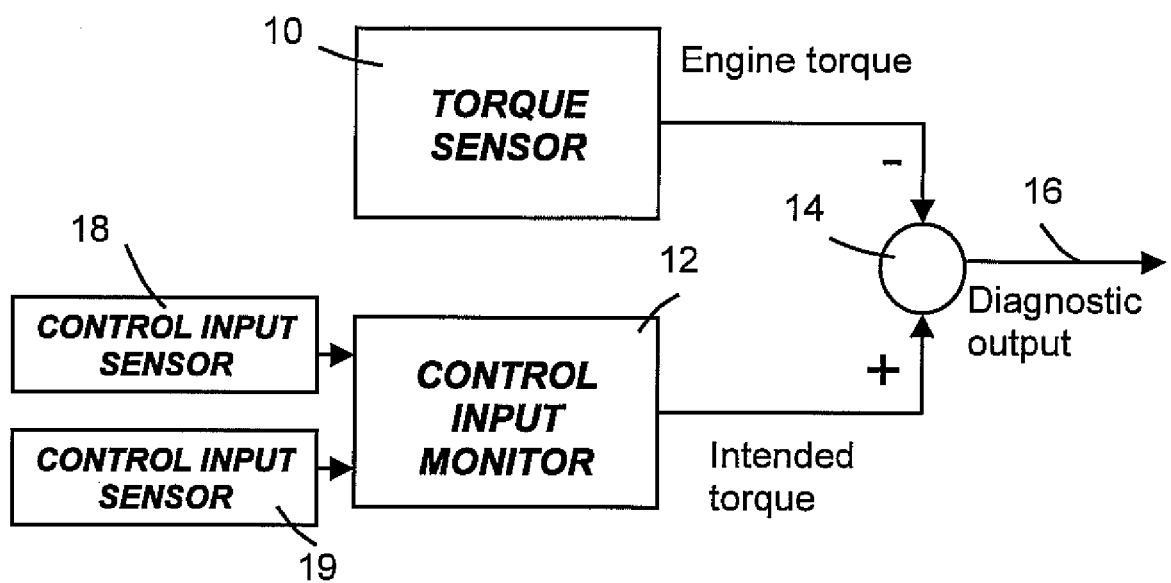
FIG. 1 illustrates a powertrain safety monitor according to an embodiment of the present invention.

FIG. 1 illustrates a powertrain safety monitor according to an embodiment of the present invention. The apparatus comprises a torque sensor 10 providing an indicated torque, an engine control input monitor 12 providing a determination of intended torque, a comparator 14 receiving the outputs of the torque sensor and engine control input monitor, and a diagnostic output 16. The torque sensor may be a direct torque sensor located within the cylinder of an engine, or may alternatively be an indirect torque sensor which determines torque from an engine output parameter, such as crankshaft rotation data. The engine control input monitor receives data from one or more control input sensors, for example an engine throttle sensor, airflow sensor, or fuel flow sensor. These sensors are represented at 18 and 19 in FIG. 1. The comparator provides a comparison of determined engine torque and intended engine torque, the diagnostic output reflecting the similarity or otherwise of these data. For example, the comparator may provide a diagnostic alert if the indicated engine torque deviates from the intended torque by greater than some threshold value. The threshold may be a ratio threshold, absolute difference threshold or some combination thereof.

In other embodiments, the output of the torque sensor may be compared with vehicle accelerometer data, and a diagnostic output provided from a comparison thereof.

The diagnostic output may include generation of an engine code for later reading by a technician, numerical data related to the difference between indicated and intended torques, a warning light an audio alert, some other alert, modification of engine operation, such as entering a safety mode, calibration of control input sensors, or some other combination thereof or other output.

Indirect torque sensors according to the invention can work in both steady state and transient regimes, and may benefit from increased torsional oscillations as these become more clearly visible patterns in the signal. The use of a neural network allows interpretation of complex patterns which could not be analyzed using a physical model of engine operation. Furthermore, the use of a neural network allows easier calibration, for example using calibration (or training) data obtained from one or more similar vehicles. Expected accuracy may be enhanced using more extensive training data.

Torque is produced during the engine's power stroke. Ideally (under steady state conditions, with an extremely stiff crankshaft subject to a large resistance torque due to the total engine load), the firing profile resembles a periodic pattern (for example, a sinusoidal function), with the power stroke corresponding to the smallest time interval (or, equivalently, the largest velocity). In reality, however, the firing profile frequently appears more like noise because of torsional oscillations in the crankshaft.

Figure 2A:
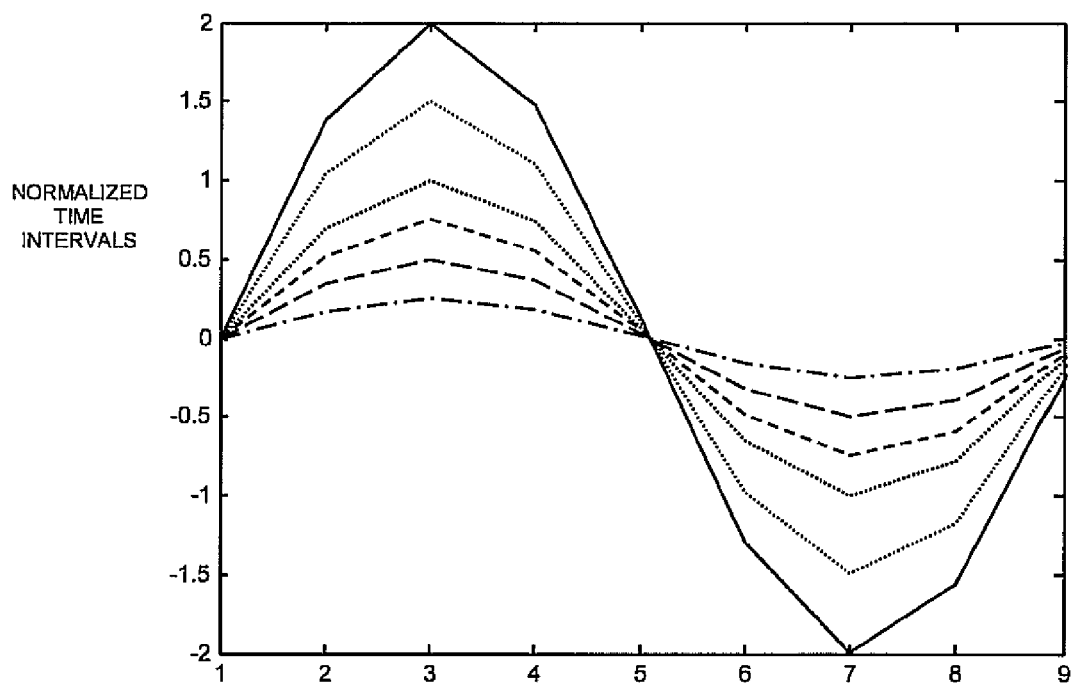
FIG. 2A shows an ideal cylinder firing profile.
Figure 2B:
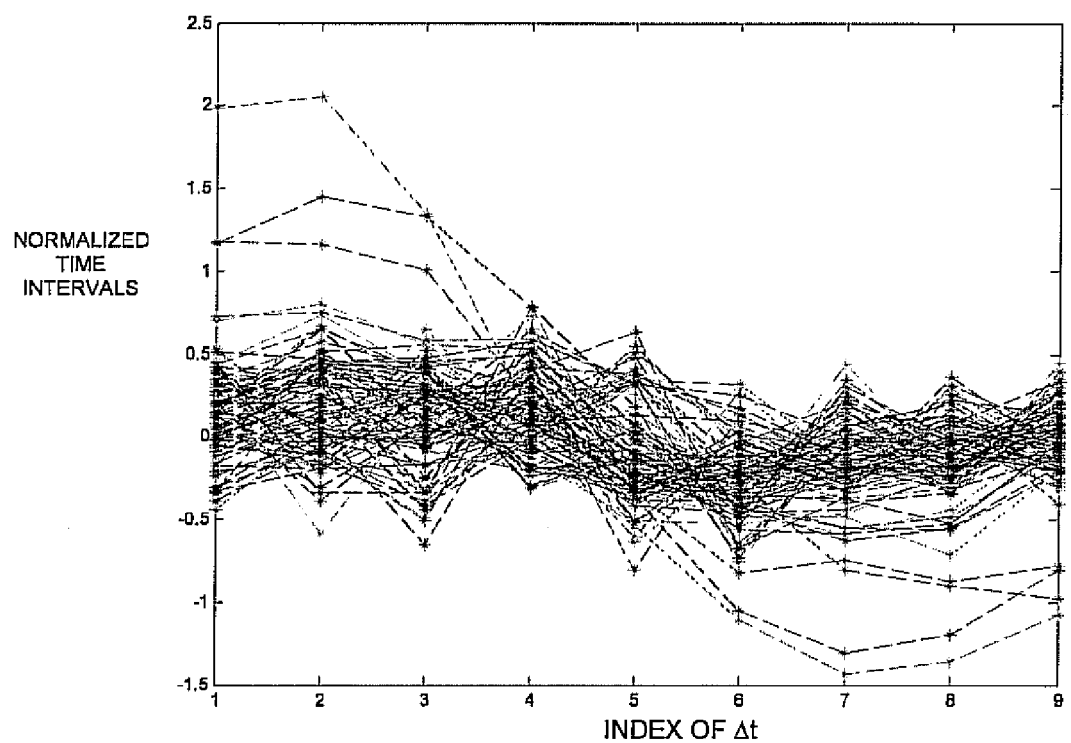
FIG. 2B shows a real cylinder firing profile, including torsional oscillations.

FIG. 2A is an illustration of an ideal cylinder firing profile. Under ideal conditions, there is a periodic pattern of time intervals expected which varies in amplitude with the varying torque. FIG. 2B shows a real cylinder firing profile, where the periodic pattern of time intervals is greatly complicated by the presence of torsional oscillations.

Since torsional oscillations vary with engine speed and load, sufficiently powerful signal processing can invert the pattern of torsional oscillations to recover an estimate of engine torque. For example, an apparatus according to an embodiment of the present invention uses a recurrent neural network (RNN) with several inputs and one output as a signal processing system. One set of inputs is derived from the sequence of time intervals; the latter reflect the fine scale of crankshaft rotation. Another set of inputs may include context variables, such as average crankshaft speed, for example from an rpm sensor such as a flywheel sensor. The output of the RNN is an estimate of torque. The adjustable parameters of the neural network, i.e., the weights for each node, may be determined by a training process.

In a typical vehicle engine, an encoder wheel is positioned on the crankshaft of the engine prior to torque converter, transmission or any other engine load component, and is typically a toothed wheel. An associated crankshaft rotation sensor provides a stream of pulses as the crankshaft rotates, and a signal preprocessor receives the stream of pulses and provides a stream of time interval data. The time intervals may represent the time for the encoder wheel to rotate the angular interval between adjacent teeth of the encoder wheel. The firing of each cylinder is spread over several time intervals, followed by another cylinder firing, and so on until the completion of one revolution of the crankshaft. In embodiments of the present invention, engine torque is determined using crankshaft rotation data, such as time interval data.

Figure 3:
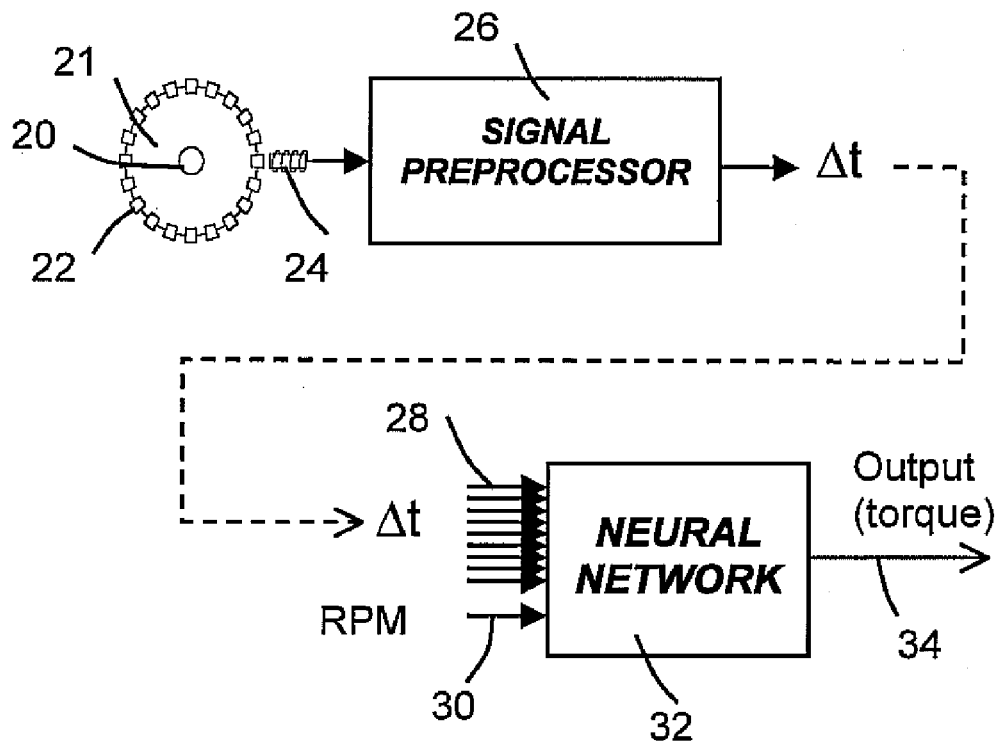
FIG. 3 shows an apparatus for determining engine torque from crankshaft rotation data, including a recurrent neural network.

FIG. 3 shows a schematic of an apparatus for determining engine torque using crankshaft rotation data. The figure shows a crankshaft 20 supporting an encoder wheel 21 having teeth, such as tooth 22, in proximity to a crankshaft rotation sensor, in this case a pick-up sensor 24. The pick-up sensor provides a stream of pulses as the crankshaft rotates. The pulses are received by signal pre-processor 26, which converts the pulse data into a series of time intervals. For example, a clock can be used to count the time interval between successive pulses. The time interval data, represented by $\Delta t$ (delta t), is provided as a series of inputs 28 to a neural network 32. The neural network also receives engine RPM data 30, for example, from an engine rotation sensor.

The recurrent neural network 32 provides a determination of torque represented as a torque output 34.

The neural network can be trained using a training process. For example, the training process may comprise installing a system, such as shown in FIG. 3, on a calibrated vehicle. The calibrated vehicle is equipped with direct torque sensors, and the vehicle operated under a variety of operating conditions. The training process includes adjusting the neural network until the torque output determined from the time interval data matches that from the direct torque sensor. However, for installation on a vehicle, the direct torque sensor is not required, as the training process provides training data that may be carried over to other vehicles of similar characteristics.

Several training methods for neural networks are known in the art, and may be used for training. A particular example is the multi-stream EKF procedure described in "Dynamical Neural Networks for Control", D. Prokhorov, G. Puskorius, and L. Feldkamp, in J. Kolen and S. Kremer (Eds.), "A Field Guide to Dynamic Recurrent Networks", IEEE Press, 2001, pp. 257-289; and L. Feldkamp, D. Prokhorov, C. Eagen, and F. Yuan, "Enhanced Multi-Stream Kalman Filter Training for Recurrent Networks", in J. Suykens and J. Vandewalle (Eds.) "Nonlinear Modeling: Advanced Black-Box Techniques", pp. 29-53, Kluwer Academic Publishers, 1998.

Different types of inputs to the RNN can be derived from an available sequence of time intervals. For example, the intervals can be inverted to produce angular velocities, and these can be used to produce values of angular acceleration. Furthermore, time intervals can be combined prior to derivation of velocity or acceleration values.

In a representative example, nine consecutive time intervals $\Delta t_k$ represented a particular segment of crankshaft rotation from the 720 degrees corresponding to an engine cycle. These were computed according to the following Equations 1-3:

$$\Delta t_k = \frac{\Delta t_k^{over}}{\Delta T} - 1, \quad (1)$$

$$\Delta T = \frac{\sum_{k=1}^{9} \Delta t_k^{over}}{9}, \quad (2)$$

$$\Delta t_k^{over} = \frac{\sum_{i=1}^{N} \Delta t_{i,k}}{N}, \quad (3)$$

where i is the index associated with firings of certain cylinders, N is the number of cylinders used in calculations of $\Delta t_k$, and k is the index of the time interval within each firing (k=1 for the first time interval of the firing, k=2 for the second time interval, and so on). Scaled values of $\Delta t_k$ were used as inputs to the RNN. Several choices of N, along with different numbers of cylinders to average over, may be used. The determined torque may be averaged over a cycle.

Multiple independent neural networks may be trained on information from different cylinders; this redundancy allows the combination of estimates, for example by averaging or median filtering, to reduce noise, increase accuracy, or enhance robustness.

Figure 4:
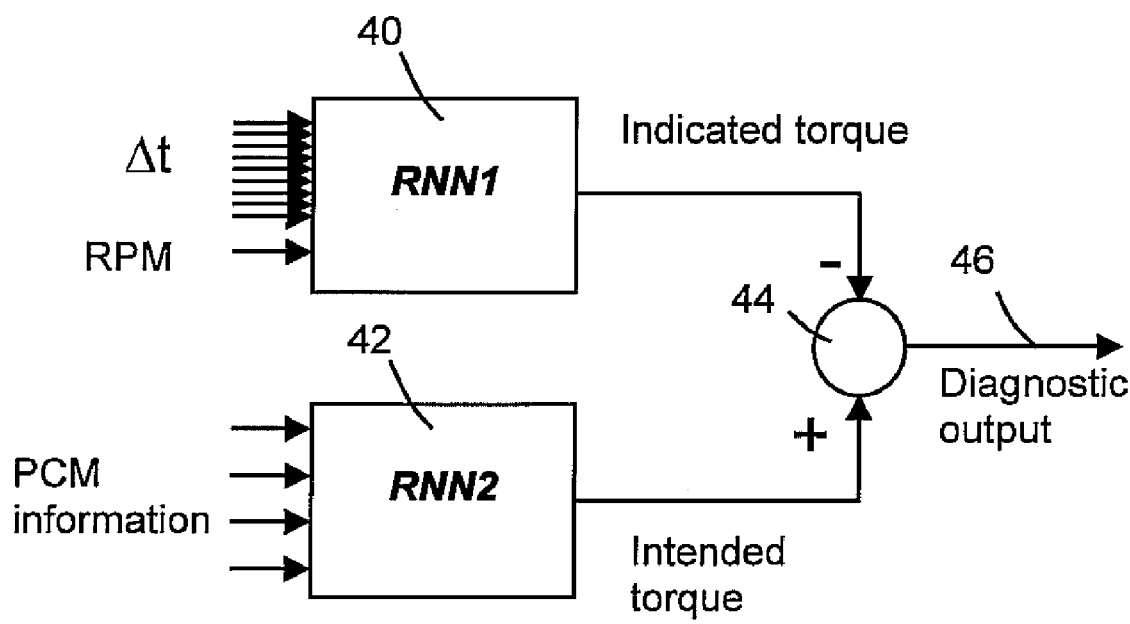
FIG. 4 shows a powertrain safety monitor, including two independent neural networks.

FIG. 4 illustrates a powertrain safety monitor, comprising a first neural network (RNN1) 40 and a second neural network (RNN2) 42. In this example, both neural networks are recurrent neural networks. The outputs of the first and second neural networks are provided to comparator 44, which provides a diagnostic output 46.

In this example, the second neural network denoted RNN2 is a recurrent neural network that provides estimates of the engine torque that are substantially independent of the estimates provided by RNN1, facilitating torque diagnostics. If the two torque estimates (one from RNN1 and another from RNN2) deviate significantly for sufficient time, this may indicate a fault in the engine torque production.

In this example, the inputs to RNN2 may include control inputs to the engine (such as throttle position, fuel and air rates), data obtained from the powertrain control module (PCM), and possibly data obtained from other vehicle sensors such as accelerometers. The inputs to RNN1 are derived from a crankshaft rotation sensor, such as an encoder wheel. Similar training methods and target signals may be used for both RNN1 and RNN2. However, outputs of the two RNNs need not exactly agree as they have different types of inputs. The outputs of the two RNNs are compared for a torque diagnostic. Significant deviations between the two outputs indicates unanticipated behavior of the engine (e.g., its torque is larger than expected). What constitutes a significant deviation can be established by a straightforward calibration process familiar to those skilled in the art.

In an example training process, a test vehicle is equipped with a torque sensor to provide target torque values with which to train the neural networks. The neural networks may also be trained using torque estimates derived from engine load values provided by the powertrain control module (PCM), or torque values derived from the known approximate relationship between the torque converter capacity and the ratio of the converter turbine speed to the engine speed. Information required to construct such torque values is available in the PCM. A separate neural network can be trained for each type of target.

Data can be collected over a broad range of operating conditions (for example, continuously varying engine speed and load, different gears, and the like), for example by driving the prototype vehicle on a test track while measuring and recording timestamps from the crankshaft position sensor as well as recording the required information from the PCM. The required time intervals are obtained by subtracting consecutive timestamps; a correction for variations in encoder tooth angular intervals ("profile correction") may also be applied.

Figure 5A:
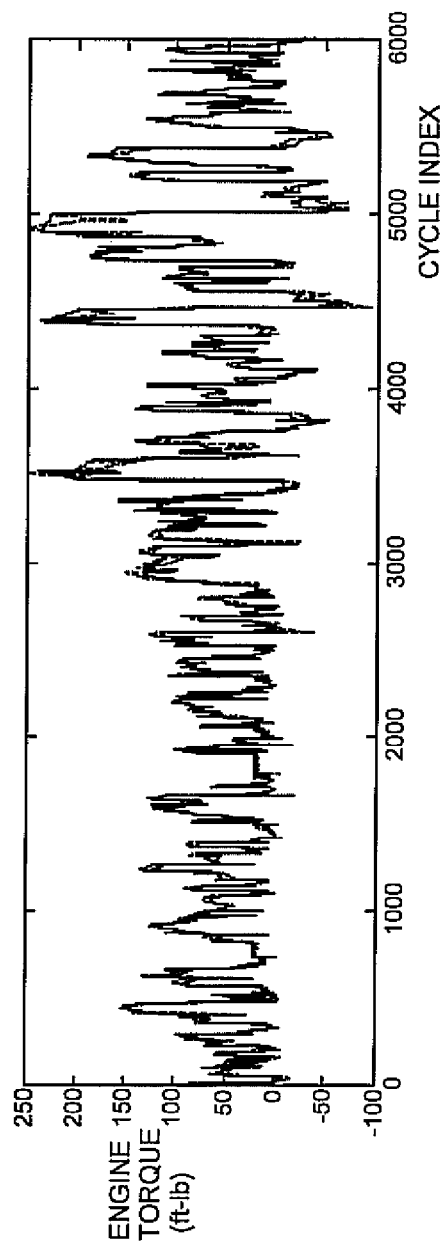
FIG. 5A shows engine torque vs. cycle data as obtained using a neural network from crankshaft rotation data.
Figure 5B:
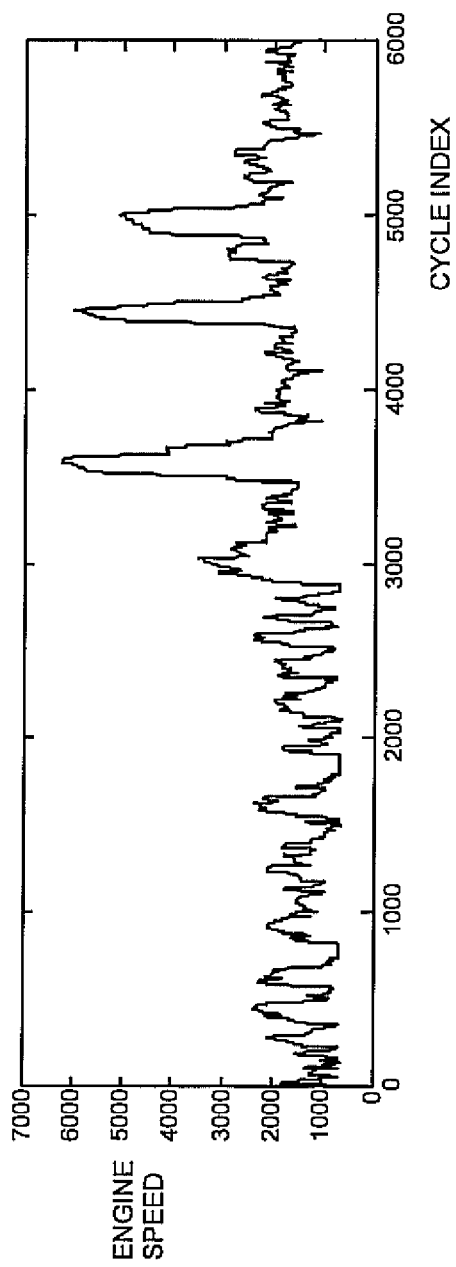
FIG. 5B shows corresponding engine speeds.

FIG. 5 illustrates the output of a recurrent neural network trained to estimate engine torque. The neural network was trained using outputs provided by the powertrain control module (PCM), namely engine load values. The engine torque (ft×lbs) is shown versus cycle index, with the RNN output is dashed, and the target torque is solid. FIG. 5B shows engine speed corresponding to the data of FIG. 5A, over the same time period. The training data included the PCM computed torque and the nine zero-mean time intervals calculated according to the Equations 1-3, discussed above. The only context input was the (scaled) engine speed, which was varied over a large range as shown in FIG. 5B.

The neural network output tracks the local mean of the target quantity very well. It may be possible to improve accuracy further by providing the neural network with additional inputs from the PCM, for example, gear selection, throttle pedal position, and brake pedal position. For powertrain safety applications using two neural networks, there is preferably a qualitative difference between inputs of the two neural networks to allow independence of their torque estimates.

Hence, in embodiments of the present invention, a neural network receives crankshaft rotation data obtained using a crankshaft sensor. The crankshaft sensor may be an encoder wheel (such as a toothed wheel), providing pulses at time intervals corresponding to angular increments of the crankshaft rotation. The neural network may be trained using a calibrated torque sensor, for example, training using a series of time interval input to provide an estimated torque that matches that of the calibrated sensor. The determined engine torque may be used for engine diagnostics and may further be compared with engine control data, such as driver commands of throttle position.

In some embodiments of the present invention, two separate neural networks are used to provide torque estimates. A first neural network uses a sequence of time intervals derived from a crankshaft rotation sensor. A second neural network provides estimates of torque that may be substantially independent of the estimates provided by the first neural network. The inputs to the second neural network may include parameters such as throttle position, fuel and air rates, and possibly vehicle sensors such as accelerometers. The two sets of outputs (estimation of torque) are compared, and a significant deviation between the two outputs is diagnostic of unanticipated engine behavior.

The one or more neural networks may be implemented on an engine computer, which receives both crankshaft rotation data and pedal position data. The neural networks, or other signal processing algorithms, may be used to compare the determined engine torque with, for example, pedal position and determine if there are significant deviations. The deviation may be used as a diagnostic of engine performance problems. Data from the powertrain control module (PCM) such as fuel rate or air supply, may be used to provide another estimate of torque. Using two neural networks, the outputs can be compared which provides a further diagnostic of engine operation. Existing direct torque sensors are expensive, and have reliability concerns. However, they may be used to calibrate an indirect sensor, such as those described herein.

The determined engine torque may be compared with outputs of one or more engine control input sensors, either as combined inputs to a neural network, or in some embodiments, independently into a plurality of neural networks. For example, the engine torque may be compared with that expected from a certain fuel or airflow rate. If the torque is larger than expected from the engine control inputs, an error code, such as an indication of possible problems with the air or fuel flow sensor, may be provided.

In the presence of engine misfire, the determined torque may be significantly less than the intended torque. Hence, embodiments of the present invention may be used as misfire detectors. However, it may be difficult to identify specific reasons for the determined torque being lower than expected. Diagnostic codes may simply provide an error indication, requiring further investigation by a technician.

The invention is not restricted to the illustrative examples described above. Examples are not intended as limitations on the scope of the invention. Methods, apparatus, signal processing algorithms, and the like described herein are exemplary and not intended as limitations on the scope of the invention. Changes therein and other uses will occur to those skilled in the art. The scope of the invention is defined by the scope of the claims.

The invention claimed is:

1. An apparatus for providing a diagnostic output related to operation of an engine, the apparatus comprising:
   a torque sensor, providing an engine torque,
   the torque sensor including a neural network, the neural network being operable to determine the engine torque using a pattern of torsional oscillations in crankshaft rotation data received by the neural network;
   an engine control input monitor, receiving control input data, and determining an intended engine torque from the control input data; and
   a comparator, receiving the engine torque from the torque sensor and the intended torque from the engine control input monitor,
   the comparator providing a diagnostic output from a comparison of the determined engine torque and the intended engine torque.

2. The apparatus of claim 1, wherein the engine control input data includes throttle position data.

3. The apparatus of claim 1, wherein the engine control input data includes fuel flow data.

4. The apparatus of claim 1, wherein the diagnostic output includes a diagnostic alert provided when the engine torque and the intended engine torque differ by greater than a threshold value.

5. The apparatus of claim 1, wherein the torque sensor is an indirect torque sensor, comprising a neural network,
   the neural network receiving crankshaft rotation data, the neural network determining the engine torque from the crankshaft rotation data.

6. The apparatus of claim 5, wherein the neural network is a recurrent neural network.

7. An apparatus for providing a diagnostic output related to operation of an engine, the apparatus comprising:
   a first neural network, receiving crankshaft rotation data, the first neural network determining an engine torque from a pattern of torsional oscillations in the crankshaft rotation data;
   a second neural network, receiving control input data, the second neural network determining an intended engine torque from the control input data; and
   a comparator, receiving the engine torque from the first neural network and the intended engine torque from the second neural network, the comparator providing the diagnostic output from a comparison of the engine torque and the intended engine torque.

8. The apparatus of claim 7, wherein the first neural network further receives an average crankshaft rotation speed from an engine rpm sensor.

9. The apparatus of claim 7, wherein the control input data comprises one or more data types selected from a group of data types consisting of throttle position data, air flow data, and fuel flow data.

10. The apparatus of claim 7, wherein the control input data includes throttle position data.

11. The apparatus of claim 7, wherein the diagnostic output includes a diagnostic warning if the engine torque and intended engine torque differ by greater than a predetermined threshold.

12. A method for determining an engine torque for an engine, the method comprising:
   providing a training configuration, the training configuration including a training engine, a torque sensor providing training torque data, and a trainable neural network, the trainable neural network receiving training operational data from the training engine and having a trainable output;
   training the trainable neural network so that the trainable output corresponds to the training torque data, the trainable neural network then having a trained configuration;
   providing a neural network, the neural network receiving operational data from the engine and having an output;
   configuring the neural network using the trained configuration of the trainable neural network, so that the neural network is operable to determine the engine torque using a pattern of torsional oscillations in crankshaft rotation data received by the neural network; and
   determining the engine torque from the output of the neural network.

* * * * *

UNITED STATES PATENT AND TRADEMARK OFFICE
Certificate

Patent No. 7,593,796 B2                                                  Patented: September 22, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Danil V. Prokhorov, Canton, MI (US); Lee A. Feldkamp, Plymouth, MI (US); Mahmoud Abou-Nasr, Canton, MI (US); and John V. James, Alpine, UT (US).

Signed and Sealed this Twenty-seventh Day of May 2014.

KHOI TRAN
*Supervisory Patent Examiner*
Art Unit 3664
Technology Center 3600